US 7,529,220 B2

(12) United States Patent
DiFazio et al.

(10) Patent No.: US 7,529,220 B2
(45) Date of Patent: May 5, 2009

(54) WIRELESS RECEIVER

(75) Inventors: Robert A. DiFazio, Greenlawn, NY (US); John W. Haim, Baldwin, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 831 days.

(21) Appl. No.: 10/629,434

(22) Filed: Jul. 29, 2003

(65) Prior Publication Data

US 2004/0125785 A1 Jul. 1, 2004

Related U.S. Application Data

(60) Provisional application No. 60/399,810, filed on Jul. 31, 2002.

(51) Int. Cl.
*H04B 7/216* (2006.01)

(52) U.S. Cl. ................ 370/342; 370/335; 370/343; 370/347

(58) Field of Classification Search ........... 714/780; 370/335–337, 342–345, 347
See application file for complete search history.

(56) References Cited

U.S. PATENT DOCUMENTS

| 6,286,122 | B1 | 9/2001 | Alanara |
| 6,331,975 | B1 | 12/2001 | Hosur et al. |
| 6,341,125 | B1 | 1/2002 | Hong et al. |
| 6,615,386 | B2 * | 9/2003 | Yano et al. ............... 714/780 |
| 6,646,993 | B1 | 11/2003 | Davies et al. |
| 6,693,952 | B1 | 2/2004 | Chuah et al. |
| 2002/0009061 | A1 | 1/2002 | Willenegger |
| 2002/0025820 | A1 | 2/2002 | Fauconnier et al. |
| 2002/0167969 | A1 * | 11/2002 | Eriksson et al. ............ 370/469 |
| 2003/0039236 | A1 * | 2/2003 | Uga ........................ 370/345 |

FOREIGN PATENT DOCUMENTS

| EP | 0 969 604 | 1/2000 |
| EP | 0969604 | 1/2000 |
| EP | 1 102 440 | 5/2001 |
| EP | 1102440 | 5/2001 |

OTHER PUBLICATIONS

"Third Generation Partnership Project; Technical Specification Group Radio Access Network; Physical channels and mapping of transport channels onto physical channels (TDD)," 3GPP TS25.221 V4.1.0 (Jun. 2001), Release 4.

(Continued)

*Primary Examiner*—Alexander Eisen
*Assistant Examiner*—Wayne Cai
(74) *Attorney, Agent, or Firm*—Volpe and Koenig, P.C.

(57) ABSTRACT

A method for performing transport format combination indicator (TFCI) processing in a wireless communications system begins by collecting received samples for a timeslot. Processing of the received samples for the timeslot that does not require a transport format combination (TFC) code list or a TFC code list valid indicator is performed. Next, a TFCI value for the timeslot is received and is processed at the timeslot rate, producing the TFC code list and the TFC code list valid indicator. Then processing in the timeslot that requires the TFC code list or the TFC code list valid indicator is performed.

5 Claims, 10 Drawing Sheets

OTHER PUBLICATIONS

"Third Generation Partnership Project; Technical Specification Group Radio Access Network; Physical channels and mapping of transport channels onto physical channels (TDD)," 3GPP TS 25.221 V4.5.0 (Jun. 2002), Release 4.

"Third Generation Partnership Project; Technical Specification Group Radio Access Network; Physical channels and mapping of transport channels onto physical channels (TDD)," 3GPP TS 25.221 V4.7.0 (Dec. 2002), Release 4.

"Third Generation Partnership Project; Technical Specification Group Radio Access Network; Physical channels and mapping of transport channels onto physical channels (TDD)," 3GPP TS 25.221 V5.1.0 (Jun. 2002), Release 5.

"Third Generation Partnership Project; Technical Specification Group Radio Access Network; Physical channels and mapping of transport channels onto physical channels (TDD)," 3GPP TS 25.221 V5.5.0 (Jun. 2003), Release 5.

"Third Generation Partnership Project; Technical Specification Group Radio Access Network; Multiplexing and channel coding (TDD)," 3GPP TS 25.222 V4.1.0 (Sep. 2001), Release 4.

"Third Generation Partnership Project; Technical Specification Group Radio Access Network; Multiplexing and channel coding (TDD)," 3GPP TS 25.222 V4.4.0 (Jun. 2002), Release 4.

"Third Generation Partnership Project; Technical Specification Group Radio Access Network; Multiplexing and channel coding (TDD)," 3GPP TS 25.222 V4.6.0 (Dec. 2002), Release 4.

"Third Generation Partnership Project; Technical Specification Group Radio Access Network; Multiplexing and channel coding (TDD)," 3GPP TS 25.222 V5.1.0 (Jun. 2002), Release 5.

"Third Generation Partnership Project; Technical Specification Group Radio Access Network; Multiplexing and channel coding (TDD)," 3GPP TS 25.222 V5.5.0 (Jun. 2003), Release 5.

"Third Generation Partnership Project; Technical Specification Group Radio Access Network; Spreading and modulation (TDD)," 3GPP TS 25.223 V4.1.0 (Jun. 2001), Release 4.

"Third Generation Partnership Project; Technical Specification Group Radio Access Network; Spreading and modulation (TDD)," 3GPP TS 25.223 V4.4.0 (Mar. 2002), Release 4.

"Third Generation Partnership Project; Technical Specification Group Radio Access Network; Spreading and modulation (TDD)," 3GPP TS 25.223 V4.5.0 (Dec. 2002), Release 4.

"Third Generation Partnership Project; Technical Specification Group Radio Access Network; Spreading and modulation (TDD)," 3GPP TS 25.223 V5.1.0 (Jun. 2002), Release 5.

"Third Generation Partnership Project; Technical Specification Group Radio Access Network; Spreading and modulation (TDD)," 3GPP TS 25.223 V5.3.0 (Mar. 2003), Release 5.

Fawer et al., "A Multiuser Receiver for Code Dvision Multiple Access Communications over Multipath Channels," IEEE Transactions on Communications, vol. 43, pp. 1556-1565 (Apr. 1995).

Hiu et al., "Successive Interference Cancellation for Multiuser Asynchronous DS/CDMA Detectors in Multipath Fading Links," IEEE Transactions on Communications, vol. 46, No. 3, pp. 384-391 (Mar. 1998).

Klein et al., "Linear Unbiased Data Estimation in Mobile Radio Systems Applying CDMA," IEEE Journal on Selected Areas in Communications, vol. 11, pp. 1058-1066 (Sep. 1993).

Klein et al., "Zero Forcing and Minimum Mean-Square-Error Equalization for Multiuser Detection in Code-Division Multiple-Access Channels," IEEE Transportation Vehicle Technology, vol. 45, pp. 276-287 (May 1996).

Pan et al., "Low Complexity Data Detection Using Fast Fourier Transform Decomposition of Channel Correlation Matrix," IEEE Global Telecommunications Conference, vol. 2, pp. 1322-1326 (Nov. 2001).

Patel et al., "Analysis of a Simple Successive Interference Cancellation Scheme in a DS/CDMA System," IEEE Journal of Select Areas in Communication, vol. 12, No. 5, pp. 796-807 (Jun. 1994).

Prasad et al., "Third Generation Mobiles Communication Systems," Arctech Publishers, Chapter 4 (2002).

Third Generation Partnership Project, "Technical Specification Group Radio Access Network; Physical layer procedures (TDD) (Release 1999)," 3GPP TS 25.224 V3.10.0 (Mar. 2003).

Third Generation Partnership Project, "Technical Specification Group Radio Access Network; Physical layer procedures (TDD) (Release 1999)," 3GPP TS 25.224 V3.12.0 (Dec. 2002).

Third Generation Partnership Project, "Technical Specification Group Radio Access Network; Physical layer procedures (TDD) (Release 4)," 3GPP TS 25.224 V4.1.0 (Jun. 2001).

Third Generation Partnership Project, "Technical Specification Group Radio Access Network; Physical layer procedures (TDD) (Release 4)," 3GPP TS 25.224 V4.5.0 (Jun. 2002).

Third Generation Partnership Project, "Technical Specification Group Radio Access Netowrk; Physical layer procedures (TDD) (Release 4)," 3GPP TS 25.224 V4.8.0 (Mar. 2003).

Third Generation Partnership Project, "Technical Specification Group Radio Access Network; Physical layer procedures (TDD) (Release 5)," 3GPP TS 25.224 V5.1.0 (Jun. 2002).

Third Generation Partnership Project, "Technical Specification Group Radio Access Network; Physical layer procedures (TDD) (Release 5)," 3GPP TS 25.224 V5.5.0 (Jun. 2003).

* cited by examiner

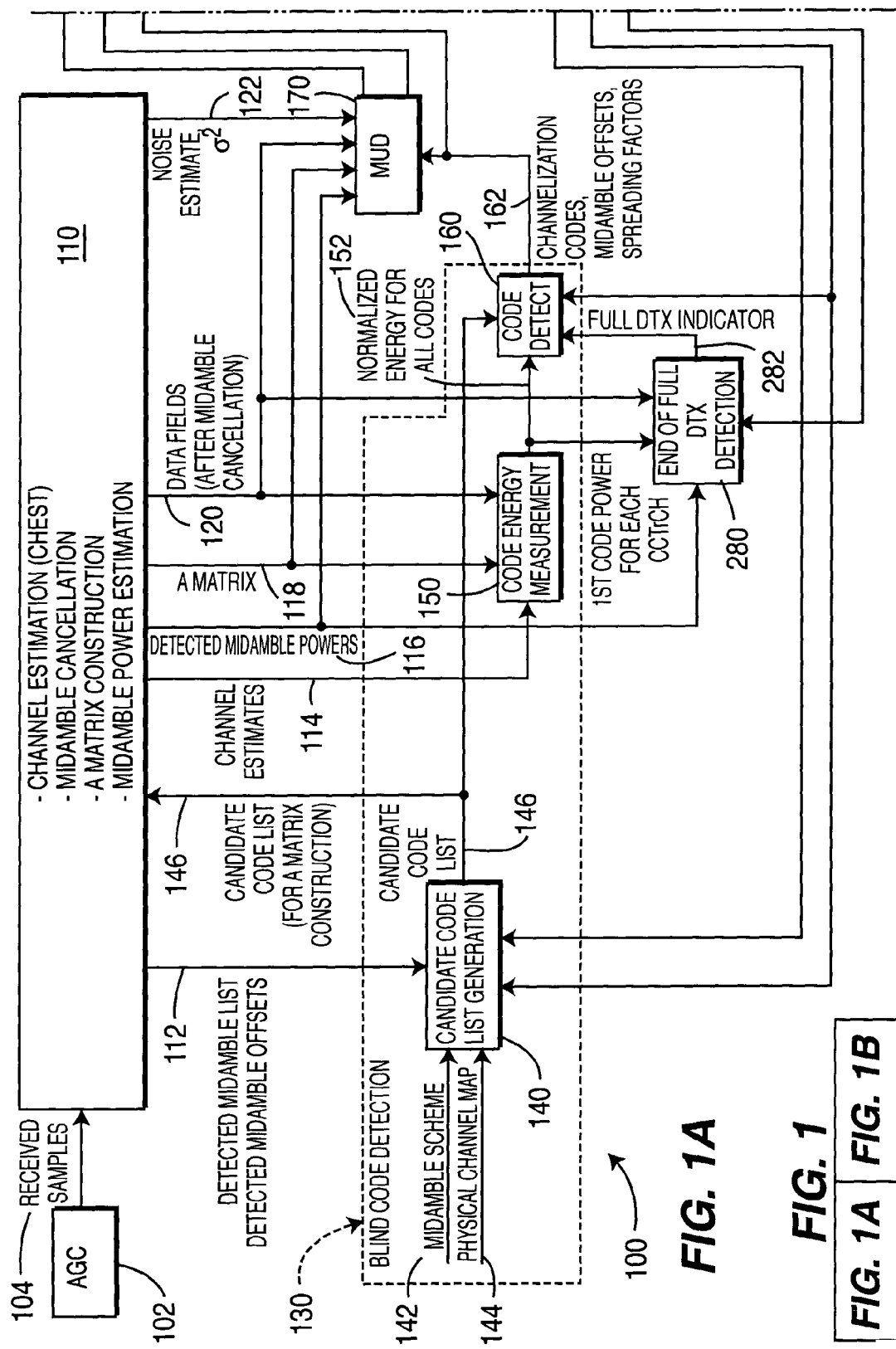

WIRELESS RECEIVER

CROSS REFERENCE TO RELATED APPLICATION(S)

This application claims priority from U.S. Application No. 60/399,810 filed Jul. 31, 2002, which is incorporated by reference as if fully set forth herein.

FIELD OF INVENTION

The present invention generally relates to code division multiple access (CDMA) receivers, and in particular relates to an apparatus and method for achieving improved performance in a receiver by demodulating one or more desired data streams that are subject to interference from signals directed to other receivers in both the user's and other cells, background noise, or distortion caused by the radio channel.

BACKGROUND

CDMA is a digital transmission technique where multiple signals are distinguished by their respective chip code sequences (codes). The signal structure generally has a time division component where transmissions are divided into, for example, a sequence of frames that may be further subdivided into timeslots. In addition, some systems use transmission time intervals (TTIs) where a TTI indicates the time interval over which a particular set of codes (and other formatting parameters) are valid. To implement a receiver, knowledge of the identity of the codes used to construct the transmitted signal is generally required.

The receiver in the user equipment (UE) may know the identity of all codes, a subset of codes, or none of the codes used for any given transmission. Codes associated with signals directed to the desired UE are called "own-UE codes." Codes associated with signals directed to other receivers are called "other-UE codes." Typically, a system includes a means for the receiver to know or learn the identity of own-UE codes via initial programming, signaling, acquisition algorithms, or various other techniques that may include trial and error and may be inefficient from a power or performance standpoint. Systems may or may not provide a means to learn the identity of other-UE codes.

Demodulation of data associated with any one code is subject to degraded bit error rate (BER) caused by interfering own-UE codes, other-UE codes, and other interference sources. The receiver can benefit from knowledge of the identity of own-UE or other-UE codes by implementing improved algorithms that provide a lower BER at a given signal-to-noise ratio in a radio channel with a certain multipath characteristic.

Multi-User Detection or a Multi-User Detector (MUD) is one example of a receiver algorithm that simultaneously processes received signals associated with multiple codes in an attempt to minimize the impact of interference and provide a lower BER, or the same BER in less favorable SNR or multipath. The MUD operates optimally when it is configured for the exact set of transmitted codes. To achieve this, a MUD algorithm requires knowledge of the identity of transmitted own-UE and other-UE codes.

One approach to implementing a MUD is to simply configure the receiver for all codes that may or may not have been transmitted. There are two disadvantages that render this approach undesirable, and possibly impractical. First, the more codes a MUD is configured to process, the greater the number of computations required to demodulate the transmitted data. Configuring a receiver only for codes that have been transmitted requires less power, fewer computations, and less processing time. Second, the BER is often degraded if the MUD is configured to process a relatively large number of codes. Configuring a receiver only for codes that have been transmitted generally provides an improvement in BER.

Blind code detection (BCD) is one method of learning the identity of transmitted codes when the receiver uses a MUD algorithm and complete knowledge of the identity of all transmitted codes is not known and/or is not signaled to the receiver. The performance of BCD is measured by how well the list of transmitted codes it creates matches the actual list of transmitted codes. BCD performance is improved by making as much use as possible of a priori and signaled information about transmitted codes and by making the information available to other receiver algorithms as quickly as possible after it is received.

For example, if information regarding the transmitted codes is signaled during timeslot n of frame k, then it would most benefit the receiver to have the signaled information available to demodulate the data in timeslot n or the first timeslot that uses the signaled information. If that were not possible, the next best design would make the information available to demodulate data in timeslot n+1, then n+2, and so on. If it is not possible to extract the information during frame k, it would benefit the receiver to make the information available as soon as possible afterwards such as at the end of frame k, during frame k+1, or frame k+2, and so on. Finally, if it is not possible to extract the information during the TTI, it would benefit the receiver to make the information available as soon as possible afterwards such as at the end of the TTI, during the next TTI, and so on.

The delay between when signaled information about transmitted codes arrives at the receiver antenna and when the information is made available to elements of the receiver for improved demodulation performance depends on the receiver architecture. In particular, limiting factors may include the latency in signal processing paths, the amount of memory that is provided to store received samples, the clock speed of the hardware, the processing speed of a microprocessor or DSP chip, DC power limitations, the maximum number of gates, and other similar structural limitations.

The Third Generation Partnership Project (3GPP) time division duplex (TDD) system, including both high and low chip rate options, and the time division-synchronous code division multiple access (TD-SCDMA) system are examples of CDMA systems that employ multi-user detection and are partitioned into TTIs, frames, and timeslots. In these systems one or more channelization codes in one or more timeslots are allocated to coded composite transport channels (CCTrCHs). In each timeslot, multiple CCTrCHs may be transmitted and may be directed to one or more UEs.

During call set-up, a CCTrCH is provided with an allocation of channelization codes and timeslots which are signaled to the UE. Even though the UE has a list of allocated codes, not all of the allocated codes are used in every transmission. Thus, the UE has partial information regarding own-UE codes. Also, the list of other-UE codes is not available, except in certain cases where some hint as to the total number of codes is indicated through physical layer signaling.

Each transmitted code is a combination of a channelization code, a channelization code specific multiplier, and a scrambling code as defined in Technical Specification Group Radio Access Network, Spreading and modulation (TDD), Release 4, 3GPP TS 25.223 V4.1.0 (2001-06). The scrambling code is signaled to the UE well before data demodulation initiates. The code specific multipliers are a priori associated with channelization codes, so the identity of the channelization code itself is the only one of the three that needs to be determined. BCD determines the identity of the transmitted codes by combining information that is signaled with code detection algorithms that operate on the received data. The output of BCD is a list of channelization codes that is provided to the MUD. The MUD also requires information about midamble offsets and spreading factors associated with the codes, which are also included in the BCD output.

If a code allocated to a CCTrCH is not transmitted, then the CCTrCH is in discontinuous transmission (DTX). A CCTrCH is said to be in "partial DTX" if not all of the allocated codes are transmitted in a given frame. It is said to be in "full DlX" if none of the allocated codes are transmitted in a frame. Techniques to monitor whether a CCTrCH is in full DTX and provide the information to BCD are disclosed in U.S. patent application Ser. No. 10/196,857 filed Jul. 16, 2002, which is incorporated by reference as if fully set forth herein. That application provides an improved method to inform BCD if a CCTrCH is in full DTX and to monitor when the CCTrCH exits full DTX. The improvement makes the information available to BCD without having to wait for the output of certain other receiver algorithms.

The identity of transmitted codes for an entire frame can be derived from the Transport Format Combination Indicator (TFCI) that is signaled to the UE and is multiplexed with the data signal as described in Technical Specification Group Radio Access Network, Physical channels and mapping of transport channels onto physical channels (TDD), Release 4, 3GPP TS 25.221 V4.1.0 (2001-06). The TFCI is transmitted in the first timeslot of every frame allocated to a CCTrCH, and optionally in subsequent timeslots in the frame. Each UE can process the received TFCI to determine the transmitted own-UE codes in each timeslot of the frame. However, this requires demodulating received data symbols and executing various other algorithms to decode and interpret the TFCI information. In a particular receiver implementation, the inherent latency of these processes could result in the identity of transmitted own-UE codes not being available when received data in the first, and possibly some subsequent, timeslots in the frame are processed in the MUD. BCD uses own-UE code information from TFCI processing when available; however, it will also function when such information is not available, though possibly with degraded performance.

A CCTrCH can comprise multiple transport channels (TrCHs). Each TrCH may have its own TTI. For a 3GPP system, per Technical Specification Group Radio Access Network, Multiplexing and channel coding (TDD), Release 4, 3GPP TS 25.222 V4.1.0 (2001-03), paragraph 4.2, a TTI may be 10, 20, 40, or 80 ms corresponding to one, two, four, or eight ten-millisecond frames. The TFCI and the transmitted codes remain constant for the shortest TTI among all TrCHs in the CCTrCH. Thus the TFCI word may be repeated multiple times per frame and multiple times across several frames. The shortest TTI among all TrCHs in the CCTrCH will be referred to as $TTI_{min}$.

SUMMARY

The present invention provides methods to extract signaled information and provide it to the receiver as soon as possible after receipt and with as little additional signal processing as possible. This invention also provides a means to use repeated TFCIs to reduce complexity or improve performance.

In general, a receiver may be configured to process more than one CCTrCH. This invention is described in the context of processing one CCTrCH; however, multiple processes can operate in parallel to support multiple CCTrCHs.

The present invention is described in the context of operating with a receiver including BCD and a MUD. However, the present invention also has application to other CDMA receiver algorithms that benefit from a timely and accurate list of transmitted codes including, but not limited to, RAKE receivers, parallel interference cancellation (PIC), successive interference cancellation (SIC), and single user detectors.

A method for performing transport format combination indicator (TFCI) processing in a wireless communications system begins by collecting received samples for a timeslot. Processing of the received samples for the timeslot that does not require a transport format combination (TFC) code list or a TFC code list valid indicator is performed. Next, a TFCI value for the timeslot is received and is processed at the timeslot rate, producing the TFC code list and the TFC code list valid indicator. Then processing in the timeslot that requires the TFC code list or the TFC code list valid indicator is performed.

BRIEF DESCRIPTION OF THE DRAWINGS

A more detailed understanding of the invention may be had from the following description of a preferred embodiment, given by way of example and to be understood in conjunction with the accompanying drawings wherein:

FIGS. 1A and 1B is a block diagram of a receiver constructed in accordance with the present invention.

DETAILED DESCRIPTION OF THE PREFERRED EMBODIMENTS

Figure 1B:
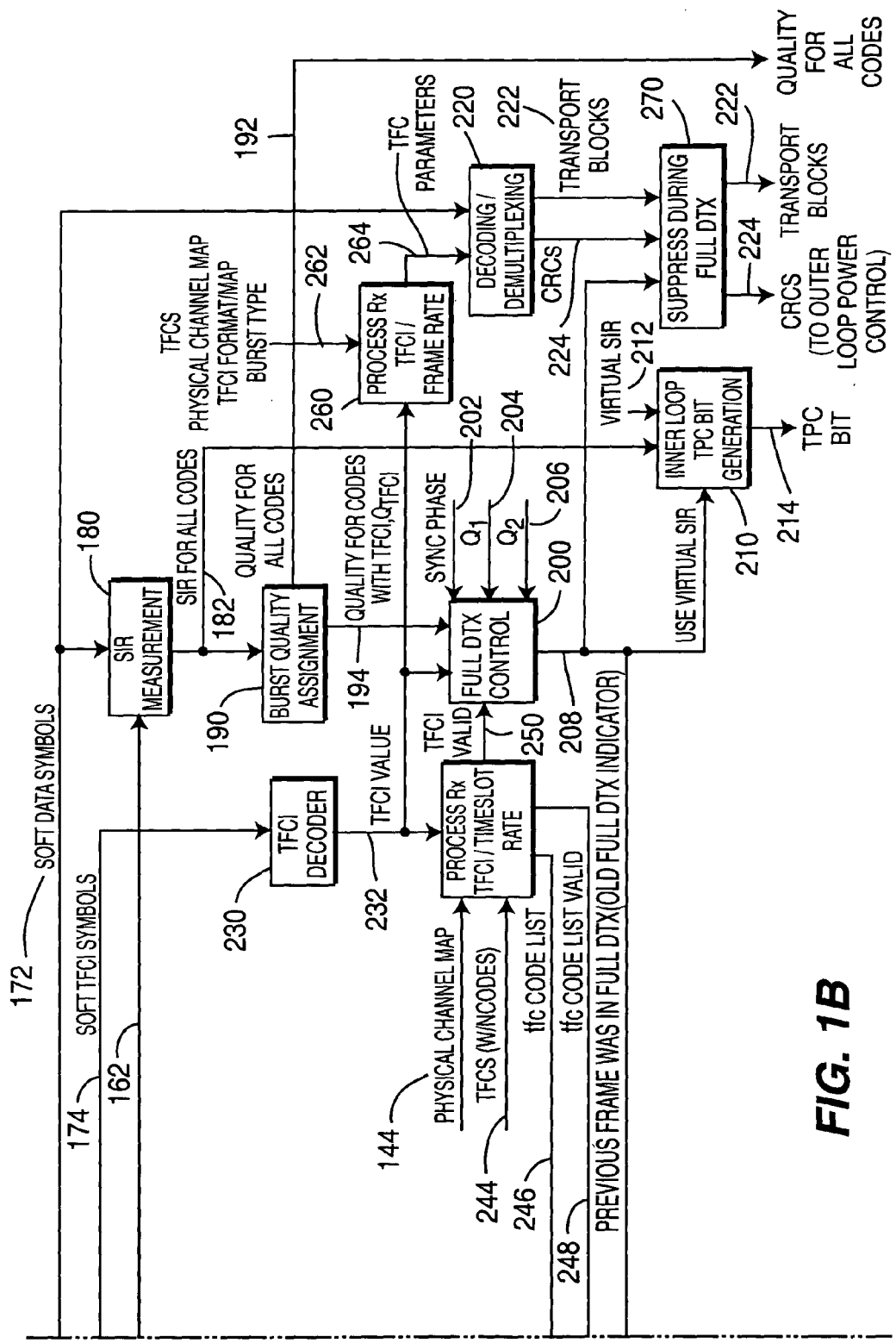

FIG. 1 is a receiver 100 constructed in accordance with the present invention and shows only those portions of the receiver 100 that are necessary for the understanding of the present invention. Additional portions of the receiver 100 that are necessary for operation include those portions that are known in the art and are not shown. An automatic gain control (AGC) 102 processes received signals and outputs received samples 104, as is known in the art. A preprocessing block 110 operates on the received samples and includes such functions as channel estimation, midamble cancellation, A matrix construction, and midamble power estimation. The preprocessing block 110 outputs a detected midamble list and detected midamble offsets 112, channel estimates 114, detected midamble powers 116, an A matrix 118 (which is the system matrix for the multi-user detector (MUD) 170), data fields 120, and a noise estimate 122. While the preprocessing block 110 is shown as a single entity for sake of simplicity, it may comprise several different blocks.

A blind code detection (BCD) block 130 includes a candidate code list generator 140, a code energy measurement block 150, and a code detector 160. The candidate code list generator 140 receives a midamble scheme 142, a physical channel map 144, and the detected midamble list and detected midamble offsets 112 as inputs and generates a candidate code list 146 as an output. The code energy measurement block 150 receives the channel estimates 114, the A matrix 118, and the data fields 120 as inputs and generates a signal containing the normalized energy for all codes 152 as an output. The code detector 160 receives the candidate code list 146, the normalized energy signal 152, a TFC code list valid flag 248, and a full DTX indicator flag 282 as inputs. The code detector 160 generates channelization codes, midamble offsets, and spreading factors 162 as outputs. The channelization codes is a list of codes that the MUD 170 demodulates.

The function of the BCD block 130 is to provide the MUD 170 with a master list of codes to demodulate in each timeslot. The BCD block 130 performs an estimation of the codes. The reason for the estimation is that the BCD block 130 essentially operates under a "chicken and egg" scenario, in which a determination of what to demodulate is based upon what has actually been demodulated. As time progresses during a frame, the estimation becomes more accurate, but at the beginning of a frame, the estimate is made based upon other measurements. Performance of the BCD block 130 is improved by providing as much a priori information as possible regarding the transmitted codes. The BCD block 130 operates in a manner similar to that described in U.S. application Ser. No. 10/396,992 filed Mar. 25, 2003, which is incorporated by reference as if fully set forth herein.

The MUD 170 receives the detected midamble powers 116; the A matrix 118; the data fields 120; the noise estimate 122; and the channelization codes, midamble offsets, and spreading factors 162 as inputs. The MUD 170 processes these signals as is known in the art and generates soft data symbols 172 and soft transport format combination indicator (TFCI) symbols 174. The TFCI symbols 174 are used to determine which codes are assigned to the receiver 100.

A signal to interference ratio (SIR) measurement block 180 receives the channelization codes, midamble offsets, and spreading factors 162 and the soft data symbols 172 as inputs. The SIR measurement block 180 generates the SIR 182 for all codes as an output.

A burst quality assignment block 190 receives the SIR 182 as an input and generates two outputs, a quality value 192 for all codes and a TFCI quality value ($Q_{TFCI}$) 194 for codes having a TFCI. The quality value 192 is used by other algorithms in the receiver 100 which are not relevant to the present invention. The TFCI is carried on a particular code and will pull the SIR for that code, so that the $Q_{TFCI}$ 194 can be determined.

The burst quality assignment block 190 maps the SIRs 182 into quality values, also referred to as Q values. For example, the Q values could be in a range from zero to one, zero to ten, zero to sixteen, or can be left as the numeric SIR value. It is possible for the SIR associated with multiple codes to be mapped to a single Q value, and is a function of the receiver 100 as to whether this type of mapping is possible. The SIR for the TFCI carrying code is mapped to the $Q_{TFCI}$ 194.

A full discontinuous transmission (DTX) control block 200 receives a SyncPhase value 202, a $Q_1$ value 204, a $Q_2$ value 206, a TFCI value 232, and a TFCI valid flag 250 as inputs. The SyncPhase value 202 is used to determine whether a channel has been established. The $Q_1$ and $Q_2$ values 204, 206 are thresholds to be applied by the full DTX control algorithm. The full DTX control block 200 generates an indicator 208 of whether the CCTrCH was in full DTX during the previous frame (shown as oldFullDTXIndicator in FIG. 1), which is used by the remainder of the signal processing to determine whether it can ignore certain signals based upon whether the CCTrCH is in full DTX.

There are two types of DTX, partial and full. In both types of DTX, the focus is on a coded composite transport channel which can be mapped into multiple timeslots and multiple codes per timeslot, and can support a particular maximum data rate. In partial DTX, if the data rate is reduced and if the transmitter determines that it does not need all of the codes in all of the timeslots, the transmitter will not send signals for all codes in all timeslots.

In full DTX, there is no data to be transmitted, so the transmitter will send a "special burst" which has a TFCI set to zero and will then go off the air for a predetermined number of frames. It is noted that while the present invention uses a TFCI set to zero, any TFCI value can be established to be the special burst value. The purpose of the special burst is to keep the receiver and the transmitter synchronized during the off-air period so that the receiver does not interpret the lack of data to mean the CCTrCH has been deleted or permanently turned off.

It is important to employ a full DTX control algorithm so that the receiver can determine when the CCTrCH exits full DTX and when it should process received signals as data. If the receiver were to ignore the fact that the CCTrCH was in full DTX, it could process noise as if it were data. In such circumstances, the receiver can have a TFCI value that appears to be valid, but it will have a poor SNR because there was no data present. Since the SNR was poor, an inner loop transmit power control (TPC) bit generator 210 will generate one or more TPC bits that signal the transmitter to increase its transmitted power. The noise would then be further processed by being decoded and demultiplexed, resulting in the generation of transport blocks filled with invalid data. The CRC checks performed on these transport blocks will very likely indicate a failure. As a result, the outer loop power control will generate a higher target SIR for the inner loop power control. The net effect is that the receiver will have incorrectly signaled the transmitter to increase its power and if the transmitter complies, it would transmit excess power generating unnecessary interference, possibly disrupting performance of other receivers in the network, and wasting power. In addition, the receiver would be left with an incorrect higher target SIR for the inner loop power control which would cause it to continue to signal the transmitter to increase its transmit power even after full DTX ends.

The full DTX control block 200 examines the QTFCI 194 to determine whether the CCTrCH is still in full DTX. To illustrate this by way of example, assume that a special burst is received and that the receiver 100 is assigned TFCI values zero through 12. In the following frame, a code is received and is demodulated to have a TFCI value of 27. Because the received TFCI value is not allowed, the CCTrCH is likely still in full DTX. If the received TFCI value falls within the valid range, then the $Q_{TFCI}$ 194 is evaluated to determine the quality of the received TFCI value. If the $Q_{TFCI}$ 194 is poor, then it is likely that the CCTrCH is still in full DTX. This algorithm will be explained in greater detail below in connection with FIG. 7.

The TPC bit generator 210 receives the SIR 182, the old full DTX indicator 208, and a virtual SIR value 212 as inputs. The TPC bit generator 210 generates a TPC control bit 214 which is used for inner loop power control to indicate to the transmitter whether the transmit power should be increased or decreased. The TPC bit generation algorithm compares received signal quality estimates, such as SIR, to a target value to determine whether to signal an increase or decease in power. The TPC bit generator 210 examines the SIR value (either the SIR 182 or the virtual SIR 212) and based upon the SIR value, will generate the control bit 214 indicating whether the base station should raise (if the SIR is low) or lower (if the SIR is high) its power.

If the old full DTX indicator 208 indicates that a CCTrCH is in full DTX, then the received signal quality estimates will not be valid. Therefore, the TPC bit generator 210 will not use the SIR 182 to compute the TPC control bit 214, but will instead use the virtual SIR 212 or some other alternate method to compute the TPC bit. The use of the old full DTX indicator 208 is one alternate algorithm that may be used to signal the full DTX state to the TPC bit generator 210. Another alternate approach includes providing the TPC bit generator 210 with the full DTX indicator 282 from the end of full DTX detection block 280, instead of the old full DTX indicator 208. A further alternate approach would be to suppress the calculation of signal quality for codes associated with CCTrCHs in full DTX. If the TPC bit generator 210 receives no signal quality estimates for a CCTrCH, it uses an alternate algorithm (such as the virtual SIR 212) to compute the TPC bit 214.

A decoding and demultiplexing block 220 receives the soft data symbols 172 and TFC parameters 264 as inputs and outputs transport blocks 222 and cyclic redundancy checks (CRCs) 224. The transport blocks 222 contain the demodulated data bits. The decoding and demultiplexing block 220 generates a CRC 224 for each transport block 222.

A typical implementation can ignore the full DTX state and incorrect data will be discarded when the CRC check fails. Outer loop power control typically examines the rate of CRC failures to determine if the target SIR must be increased and whether the transmitter must increase its power. If CRC failures are occurring as a result of DTX rather than insufficient transmit power, increased transmit power is not actually required. However, the receiver 100 will still signal the transmitter to increase power, thus increasing the interference to other users and wasting power at the transmitter. The present invention improves the performance of outer loop power control, and any other algorithms that examine CRC failures, by not reacting to CRC failures during full DTX, as explained below in connection with the suppress during full DTX block 270.

A TFCI decoder 230 receives the soft TFCI symbols 174 from the MUD 170 as input and outputs a TFCI value 232. The purpose of the TFCI decoder 230 is to indicate which of the receiver's own codes have been transmitted. The TFCI value 232 is not the list of transmitted codes, but is an index to a table that contains the number of transmitted codes. As further discussed below, the table is often called a transport format combination set (TFCS). Because the TFCI value 232 gets demodulated along with the regular data received, the TFCI will not be available and cannot be used when the data contained in the first allocated timeslot of a CCTrCH in a TTI is demodulated.

The combined operation of the MUD 170 and the TFCI decoder 230 will sometimes result in the output of an erroneous TFCI value 232, which is a decoded TFCI value in the receiver that is not the same as the TFCI that was signaled by the transmitter for the current frame. An infeasible TFCI value is an erroneous TFCI value that is not a valid index of the TFCS. If the TFCI value 232 is infeasible, a process received TFCI at timeslot rate block (hereinafter "TFCI timeslot block") 240 and a process received TFCI at frame rate block (hereinafter "TFCI frame block") 260 will detect this condition and will not use the infeasible TFCI value 232. The TFCI timeslot block 240 and the TFCI frame block 260 will instead use the decoded TFCI value 232 from the previous frame or from the previous $TTI_{min}$ during which the CCTrCH had one or more allocated timeslots in which the TFCI value 232 was not infeasible.

One alternate approach upon receipt of an infeasible TFCI value is for the TFCI timeslot block 240 and the TFCI frame block 260 to use a TFCI value 232 corresponding to the first entry in the TFCS. Another alternate approach is for the TFCI timeslot block 240 and the TFCI frame block 260 to maintain a list of recently decoded valid TFCI values 232 and select a TFCI value from the list that has been output from the TFCI decoder 230 most frequently. Regardless of the approach chosen, when the TFCI timeslot block 240 detects an infeasible TFCI value 232, it indicates in a TFCI valid flag 250 that the received and decoded TFCI value 232 is invalid.

The TFCI timeslot block 240 receives the TFCI value 232, the physical channel map 144, and a transport format combination set (TFCS) 244 as inputs. The TFCS 244 contains the number of codes (Ncodes) associated with each TFCI value. The TFCI timeslot block 240 outputs a TFC code list 246, a TFC code list valid flag 248, and the TFCI valid flag 250. By decoding the TFCI in the timeslot, the TFCI timeslot block 240 can provide an indication of which own-UE codes have been transmitted in the timeslot that has just been processed, as well as in other timeslots that are allocated to the CCTrCH in the same TTI. If the TFCI value 232 is zero or corresponds to an entry in the TFCS, then a list of transmitted codes can be determined and is output as the TFC code list 246. The TFC code list valid flag 248 is set to true if the TFCI has been decoded, the TFCI value 232 is not infeasible, and the TFC code list 246 has been determined. The TFCI valid flag 250 is set to true if the TFCI has been decoded and the TFCI value 232 is not infeasible.

If the processing were delayed until the end of the frame, then the ability to use the own-UE code information conveyed by the TFCI to optimize the processing for the remaining timeslots is lost. The TFCI timeslot block 240 sends the TFC code list 246 to the BCD block 130, so the MUD 170 knows as quickly as possible which codes it needs to process. The TFCI timeslot block 240 does not operate on every timeslot, but rather only operates on those timeslots that contain a TFCI.

The TFCI frame block 260 receives the TFCI value 232 and a TFCS, a physical channel map (which is the physical channel map 144), a TFCI format/map, and a burst type as inputs 262. The TFCI frame block 260 outputs TFC parameters 264 required by the decoding and demultiplexing block 220. The TFC parameters 264 may be entries in the TFCS table indexed by the TFCI value 232 or may be computed from the entries.

A suppress during full DTX block (hereinafter "suppress DTX block") 270 receives the old full DTX indicator 208, the transport blocks 222, and the CRCs 224 as inputs. If the old full DTX indicator 208 indicates that the CCTrCH is in full DTX, then the suppress DTX block 270 prevents the reporting of CRC failures and prevents further processing of the transport blocks 222 in the receiver 100, since the CCTrCH has been determined to be in full DTX and the transport blocks 222 and the CRCs 224 are assumed to be based on processing noise rather than a transmitted signal. If the CCTrCH is not in full DTX, then the suppress DTX block 270 outputs the transport blocks 222 and the CRCs 224 for use by other receiver processes including, but not limited to, outer loop power control. Use of the old full DTX indicator 208 is one alternate for activating the suppress DTX block 270. Any alternate algorithm that is used to determine whether a CCTrCH is in full DTX may also be used to activate the suppress DTX block 270.

An end of full DTX detection block (hereinafter "end DTX block") 280 receives the detected midamble powers 116, the data fields 120, the normalized energy for all codes 152, and the old full DTX indicator 208 as inputs. The normalized energy for all codes 152 values includes the first code power for each coded composite transport channel. The end DTX block 280 outputs a full DTX indicator flag 282. The end DTX block 280 performs a quick check during a timeslot to determine if the CCTrCH has exited full DTX. As a backup to the end DTX block 280, the full DTX control block 200 is executed after the MUD 170 to help in avoiding processing timeslots while the CCTrCH is in full DTX. The end DTX block 280 will look at the first timeslot in the coded composite transport channel that is supposed to have the TFCI to attempt to determine whether the CCTrCH is in full DTX or not.

There are two parts to the end of DTX detection. The first detection is performed in real time by the end DTX block 280 when a timeslot is received and before data is passed to the MUD 170. If the end DTX block 280 indicates that the CCTrCH is in full DTX, then any data received will be ignored and not passed to the MUD 170. Because the end DTX block 280 may have a relatively high false alarm rate, the second detection via the full DTX control block 200 assists in lowering the number of false restarts.

Figure 2:
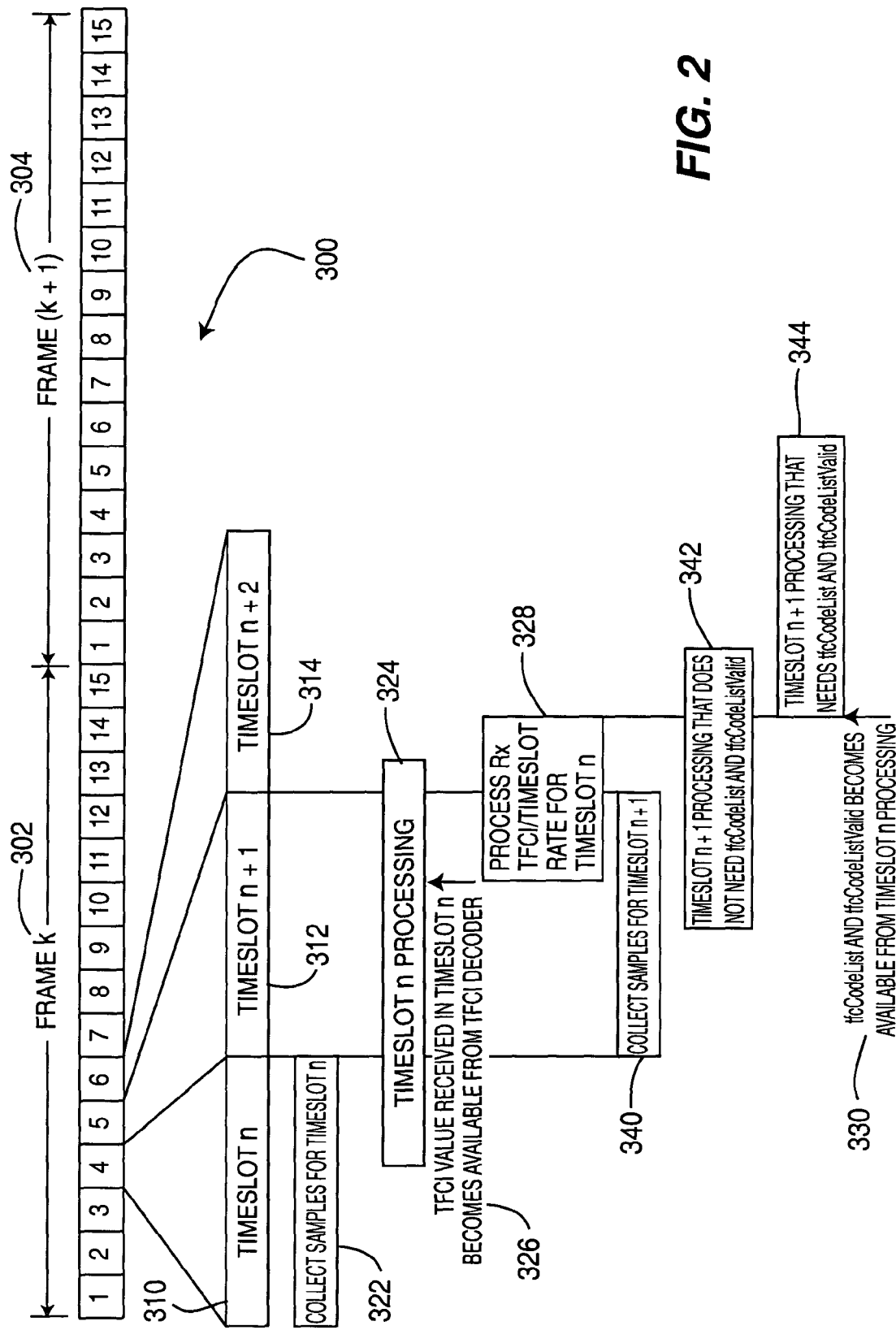
FIG. 2 is a timing diagram of a fast TFCI processing algorithm according to the present invention.
Figures 3, 6:
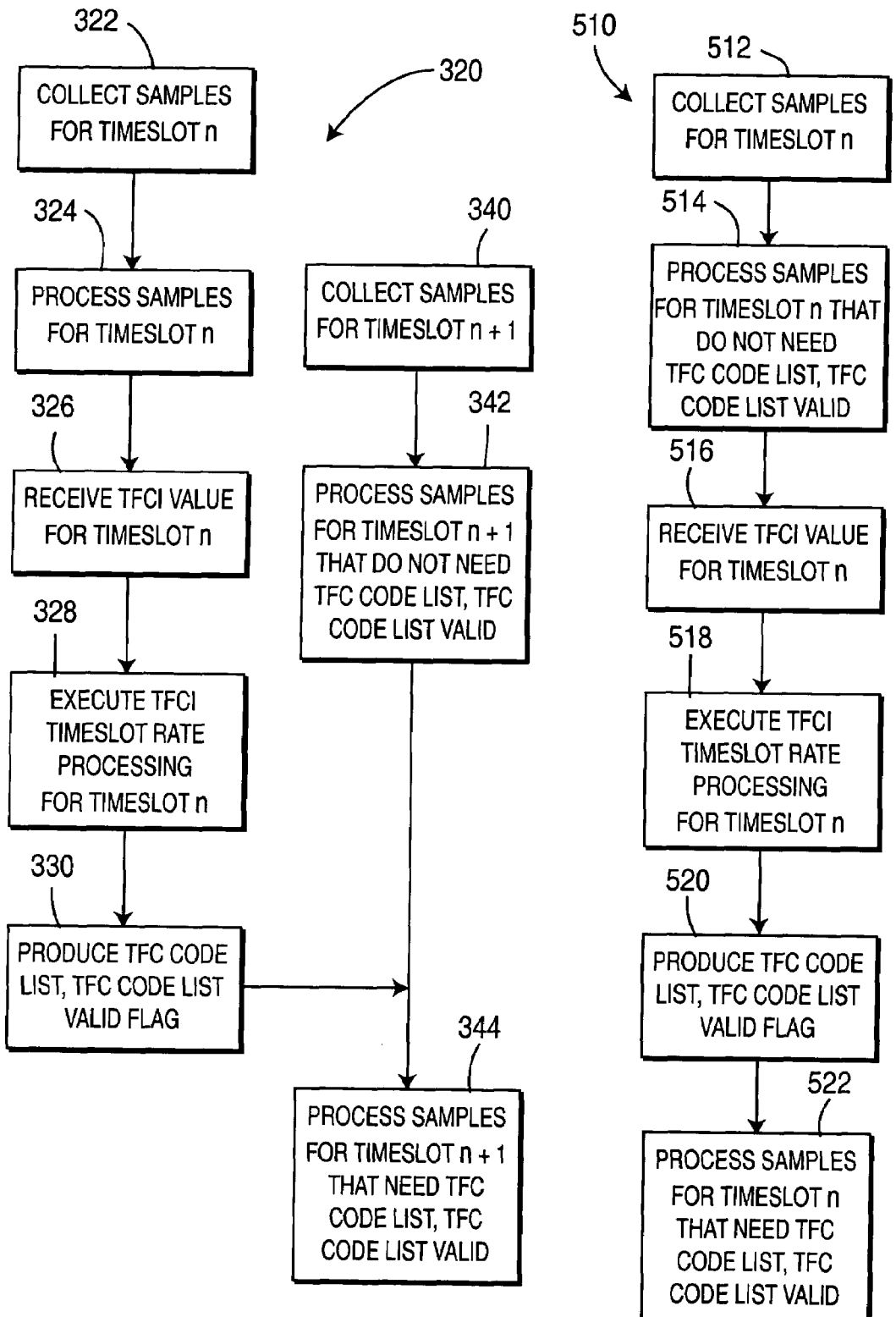
FIG. 3 is a flowchart of the fast TFCI processing algorithm shown in FIG. 2.
FIG. 6 is a flowchart of the alternate fast TFCI processing algorithm shown in FIG. 5.

FIGS. 2 and 3 illustrate a timing diagram and a flowchart, respectively, of a fast TFCI processing algorithm in accordance with the present invention. For sake of simplifying the discussion, steps in the flowchart of FIG. 3 that correspond to blocks in the timing diagram of FIG. 2 will be given like reference numerals. A timing diagram 300 shows a frame k (302) and a frame k+1 (304), each having 15 timeslots, including timeslot n (310), timeslot n+1 (312), and timeslot n+2 (314). A fast TFCI processing algorithm 320 in accordance with the present invention begins with collecting samples for timeslot n (block 322). The samples for timeslot n are processed by demodulating the samples after the midamble has been detected (block 324), which results in the soft symbols being output by the MUD. Then the TFCI value for timeslot n is received from the TFCI decoder (block 326). The TFCI timeslot rate processing is then executed for timeslot n (block 328), to produce the TFC code list and the TFC code list valid flag to the BCD algorithm (block 330). The BCD algorithm uses the TFC code list and the TFC code list valid flag to construct the list of channelization codes, midamble offsets, and spreading factors for the MUD for timeslot n+1 and all subsequent timeslots that have been allocated to the CCTrCH.

Simultaneously with block 324, samples are collected for timeslot n+1 (block 340) and put into a memory storage. Because the sample processing can take longer than one timeslot, it is necessary to collect the samples for timeslot n+1 while the samples for timeslot n are being processed; otherwise, the samples from timeslot n+1 would be lost. Next, samples for timeslot n+1 that do not need the TFC code list and the TFC code list valid flag are processed (block 342). Then after the TFC code list and the TFC code list valid flag have been produced (block 330), the samples for timeslot n+1 that require the TFC code list and the TFC code list valid flag can be processed (block 344).

The TFCI processing algorithm 320 is considered to be "fast" because rather than waiting until the end of the frame to perform the TFCI processing, it is done as fast and as early in the frame as possible. This information is then used for the timeslot n+1 processing.

Figure 4A:
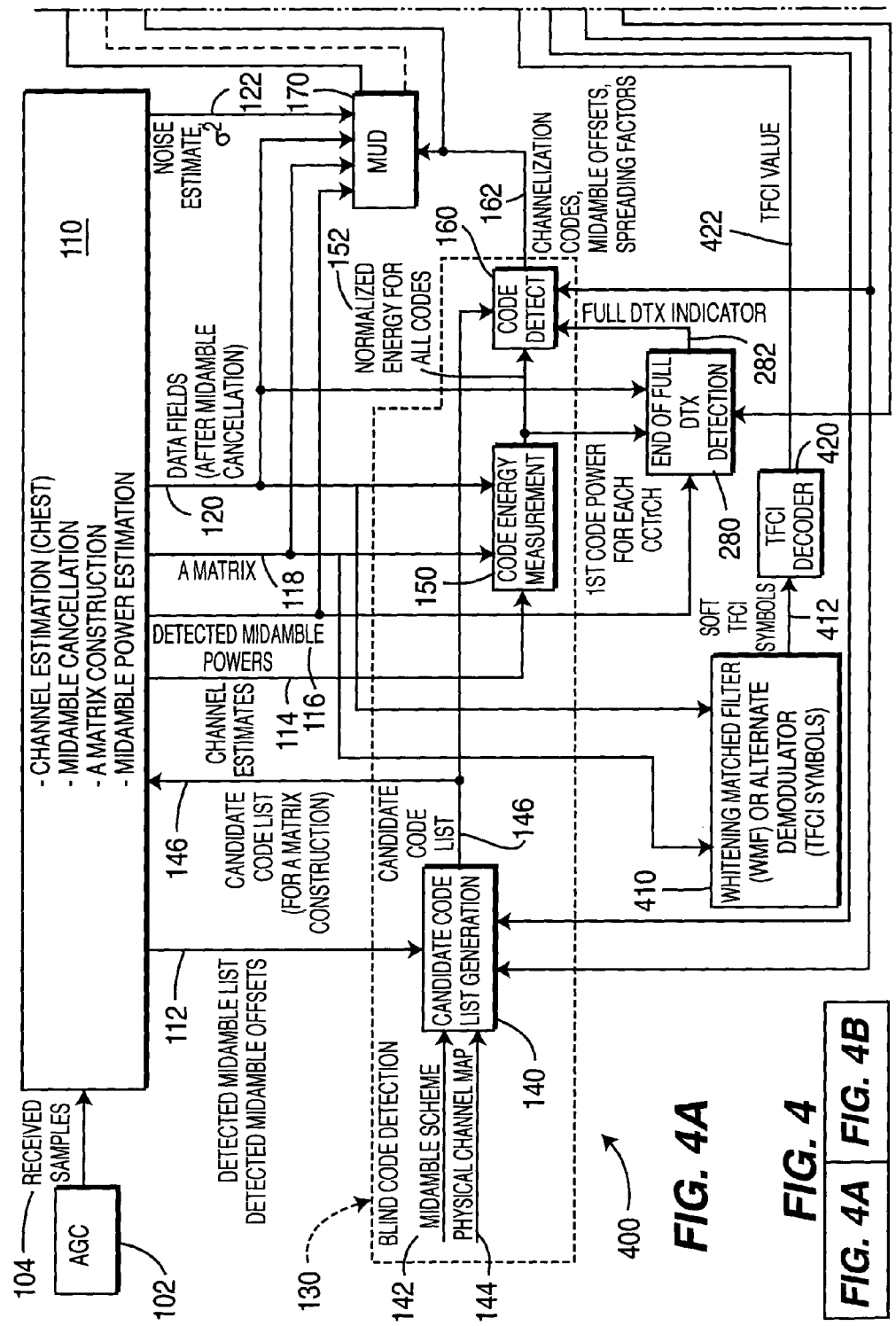
FIGS. 4A and 4B is a block diagram of an alternate embodiment of a receiver constructed in accordance with the present invention.
Figure 4B:
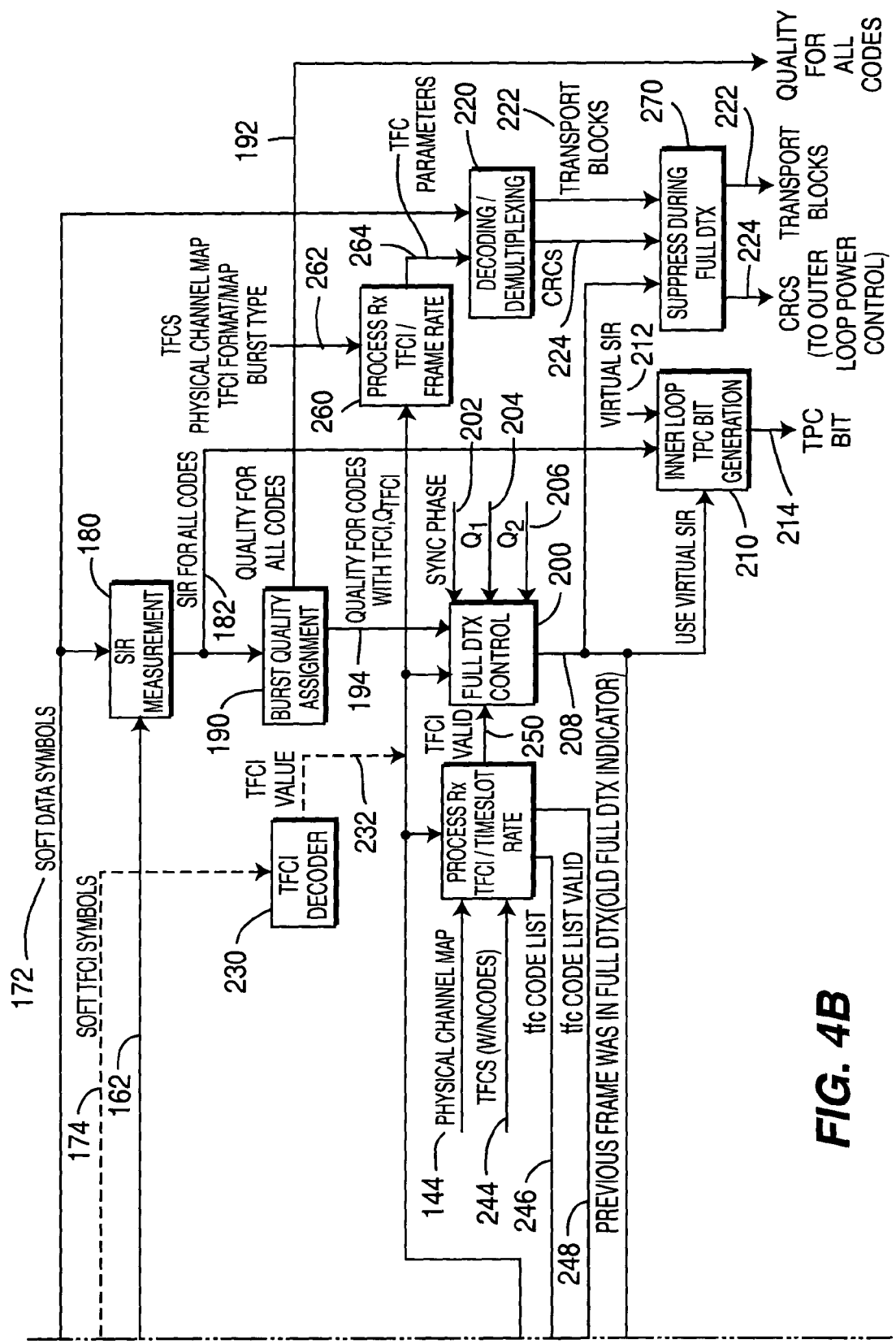

FIG. 4 is a block diagram of an alternate embodiment of a receiver 400 constructed in accordance with the present invention. Elements that are the same as in FIG. 1 have been given like reference numerals and operate in the same manner as discussed above in connection with FIG. 1. A whitening matched filter 410 receives the A matrix 118 and the data fields 120 as inputs, and extracts the soft TFCI symbols 412 and outputs them to a second TFCI decoder 420. The second TFCI decoder 420 outputs a TFCI value 422 in a manner similar to the TFCI decoder 230.

The whitening matched filter 410 is able to extract the soft TFCI symbols 412, because a whitening matched filter is also used in the MUD 170. The benefit of adding the whitening matched filter 410 and the second TFCI decoder 420 is that the TFCI value 422 can be obtained faster than via the MUD 170 and the TFCI decoder 230. The latency is reduced in both the path that feeds the TFCI value 422 to the TFCI timeslot block 240 and in providing the TFC code list 246 and the TFC code list valid flag 248 to the BCD control block 130. By keeping both TFCI decoders 230, 420 in the receiver 400, the TFCI values 232, 422 will be available for use in timeslot n, instead of having to wait for timeslot n+1.

The processing timeline for the operation of the receiver 400 is generally the same as that shown in FIG. 2 for the receiver 100. An important difference is that the processing in the TFCI timeslot block 240 for timeslot n can start sooner and will finish sooner, preferably in time for the BCD 130 and subsequent receiver 400 processing, such as the MUD 170, to use the TFC code list 246, the TFC code list valid flag 248, or values derived from them to process samples in timeslot n. The basic operation of the receiver 400 is as follows. First, samples received in timeslot n are collected and processed to provide the soft TFCI symbols 412 at the whitening matched filter 410 output.

Then the TFCI symbols 412 for the first timeslot allocated to a CCTrCH in each TTI are extracted from the whitening matched filter 410 output. Next, the TFCI symbols 412 are decoded by the TFCI decoder 420 into the TFCI value 422. The TFCI timeslot rate block 240 is then executed to provide the TFC code list 246 and the TFC code list valid flag 248 to the BCD block 130. The BCD block 130 uses the TFC code list 246 and the TFC code list valid flag 248 to construct the list of channelization codes, midamble offsets, and spreading factors 162 for the MUD 170 for timeslot n and all subsequent timeslots that have been allocated to the CCTrCH.

Figure 5:
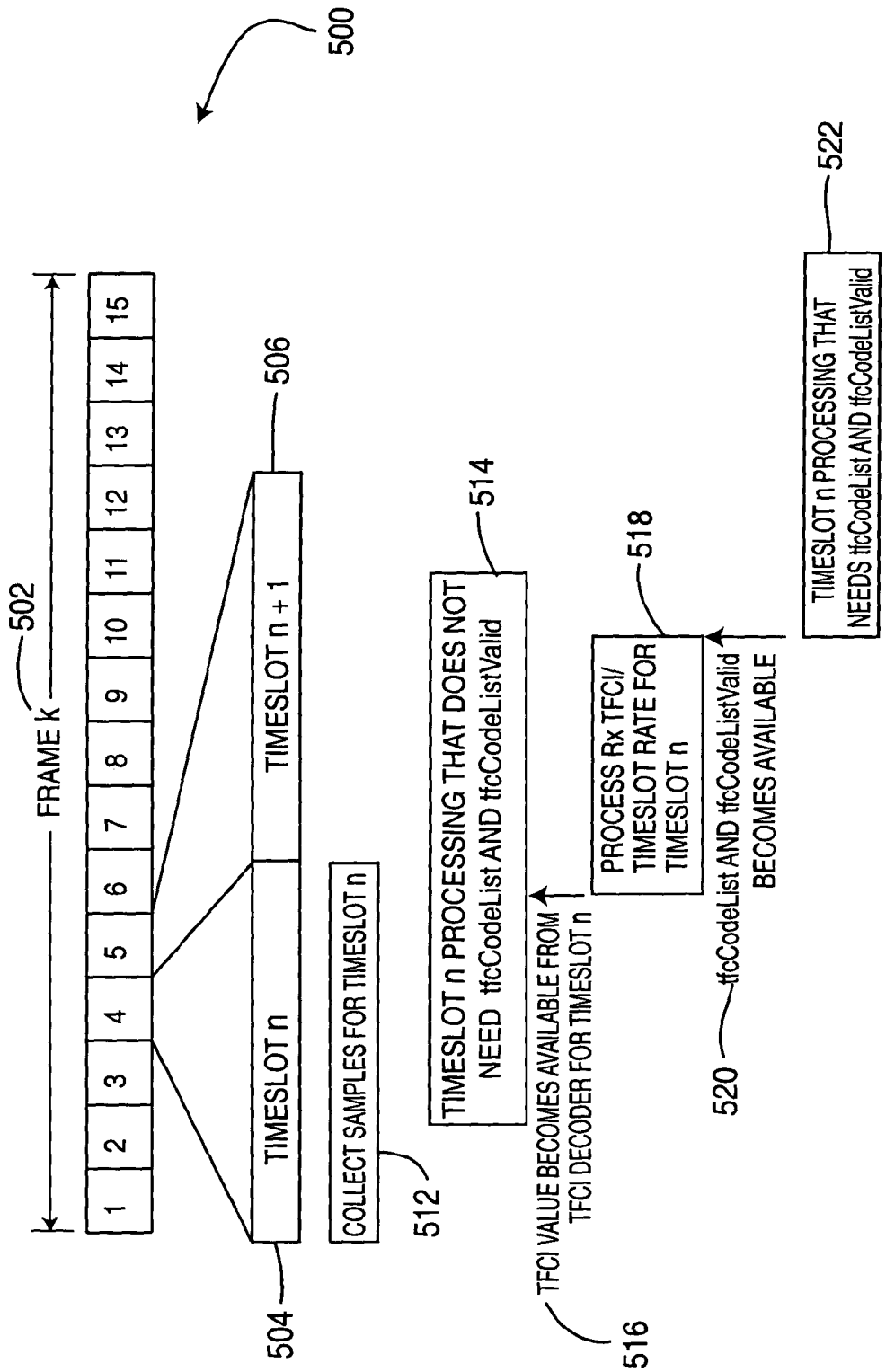
FIG. 5 is a timing diagram of an alternate fast TFCI processing algorithm according to the present invention.

FIGS. 5 and 6 illustrate a timing diagram and a flowchart, respectively, of an alternate fast TFCI processing algorithm in accordance with the present invention. For sake of simplifying the discussion, steps in the flowchart of FIG. 6 that correspond to blocks in the timing diagram of FIG. 5 will be given like reference numerals. A timing diagram 500 shows a frame k (502) having 15 timeslots, including timeslot n (504) and timeslot n+1 (506). A fast TFCI processing algorithm 510 in accordance with the present invention begins with collecting samples for timeslot n (block 512). The samples for timeslot n that do not need the TFC code list and the TFC code list valid flag are processed (block 514). Then the TFCI value for timeslot n is received from the TFCI decoder (block 516). The TFCI timeslot rate processing is then executed for timeslot n (block 518), to produce the TFC code list and the TFC code list valid flag (block 520). Finally, the samples for timeslot n that require the TFC code list and the TFC code list valid flag are processed (block 522).

To further improve BCD and receiver performance, the timeslot rate TFCI processing for timeslot n (block 518) is performed before any other data symbols in timeslot n are processed. This alternate embodiment provides the TFC code list and the TFC code list valid flag to the BCD in time to be used in all timeslots in a TTI allocated to a CCTrCH, including the first timeslot that carries the TFCI symbols.

The alternate algorithm 510 can be used in connection with the alternate receiver 400 described above. By providing the whitening matched filter 410, the algorithm 510 is able to operate quickly and produce results in timeslot n. Certain functions in the preprocessing block 110, for example the channel estimation, need to run before the whitening matched filter 410. These functions are among the timeslot n processing that does not need TFC code list 246 and the TFC code list valid flag 248 (block 514). After a certain period of time, dependent upon the length of the processing, the TFCI value is generated (block 516). This process is described as "faster" than that described above in connection with the receiver 100 and the MUD 170 for producing the TFCI value because the TFCI value has been obtained, passed to the BCD 130, and the BCD 130 provides its output in time to be used by the MUD 170 in processing the signal for timeslot n. It is important that the algorithm 510 be able to have the TFCI value available before subsequent processing of the timeslot n signal, so that the subsequent processing (such as the MUD 170) can use the information about the transmitted codes that is conveyed by the TFCI value.

Figure 7:
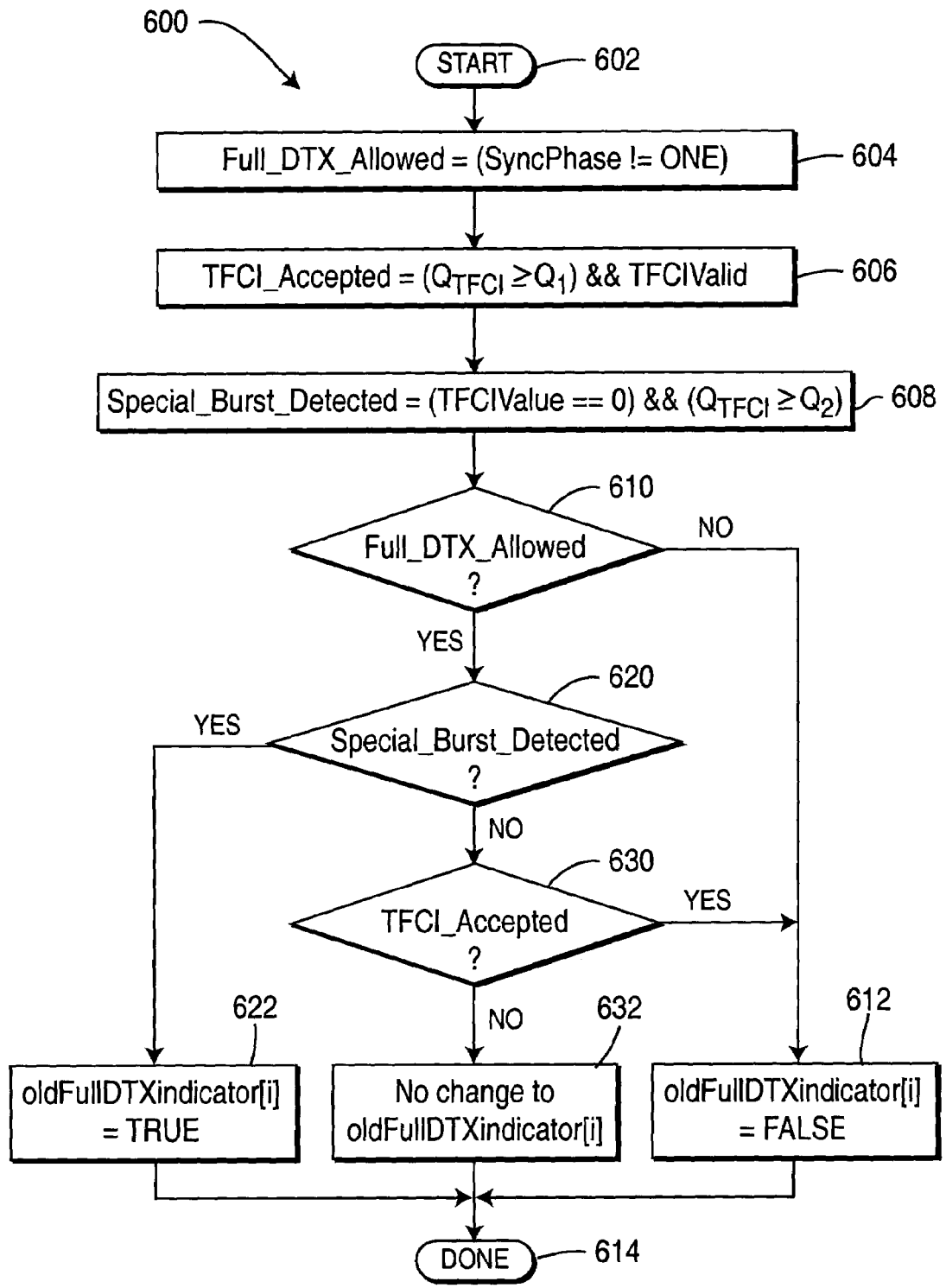
FIG. 7 is a flowchart showing a full DTX control algorithm in accordance with the present invention.

Referring now to FIG. 7, an algorithm 600 for full DTX control begins (step 602) by instructing the full DTX control block to initialize the old full DTX indicator to false and instructing the end of full DTX detection block to initialize the full DTX indicator to false. Next, three flags are set as follows. A full DTX allowed flag is set based upon whether the SyncPhase is equal to one (step 604). If the SyncPhase is equal to one, then the receiver is in the process of setting up a channel, so full DTX is not yet applicable and the flag is set to false. If the SyncPhase is not equal to one, then the flag is set to true. A TFCI accepted flag is set to true if the quality estimate of the TFCI meets a first threshold ($Q_{TFCI} \geq Q_1$) and if the TFCI value is valid (step 606); otherwise, this flag will be set to false. A special burst detected flag is set to true if the TFCI value is zero and if the quality of the TFCI meets a second threshold ($Q_{TFCI} \geq Q_2$; step 608); otherwise this flag will be set to false.

The flags are then evaluated to set the old full DTX indicator, based on whether the CCTrCH was in full DTX during the previous frame. A first check is made as to whether the CCTrCH is allowed to enter full DTX (step 610). If full DTX is not allowed, the old full DTX indicator is set to false (step 612) and the algorithm terminates (step 614). If full DTX is allowed, then a determination is made whether a special burst was received (step 620). If a special burst has been detected, the old full DTX indicator is set to true (step 622) and the algorithm terminates (step 614). If no special burst was detected, then a determination is made whether the TFCI is accepted (step 630). If the TFCI has been accepted, then the old full DTX indicator is set to false (step 612) and the algorithm terminates (step 614). If the TFCI is not accepted, then there is no change to the old full DTX indicator (step 632) and the algorithm terminates (step 614).

To improve BCD and receiver performance, the codes that have not been transmitted because a CCTrCH is in full DTX are not included in the list of transmitted codes provided to the MUD. Since the first timeslot allocated to a CCTrCH in each frame always includes transmission of the TFCI-carrying code (timeslot n), information regarding the full DTX state is made available to BCD in time to be used in all timeslots in a TTI allocated to a CCTrCH that follow the first timeslot carrying the TFCI symbols. The logic to determine if a CCTrCH is in full DTX is separated into two parts: an end of full DTX detection algorithm that operates at the timeslot rate and a full DTX control algorithm that operates at the frame rate. U.S. patent application Ser. No. 10/196,857 describes an end of full DTX algorithm based on detecting the presence of a TFCI-carrying burst. That patent application also includes a "sanity check" that is similar to the full DTX control algorithm. However, the sanity check uses information that is not available until the decoding and demultiplexing algorithms are complete, and the results may not be available in time to process the next frame. The full DTX control algorithm 600 is an improvement over the sanity check in that it has lower latency.

Figure 8A:
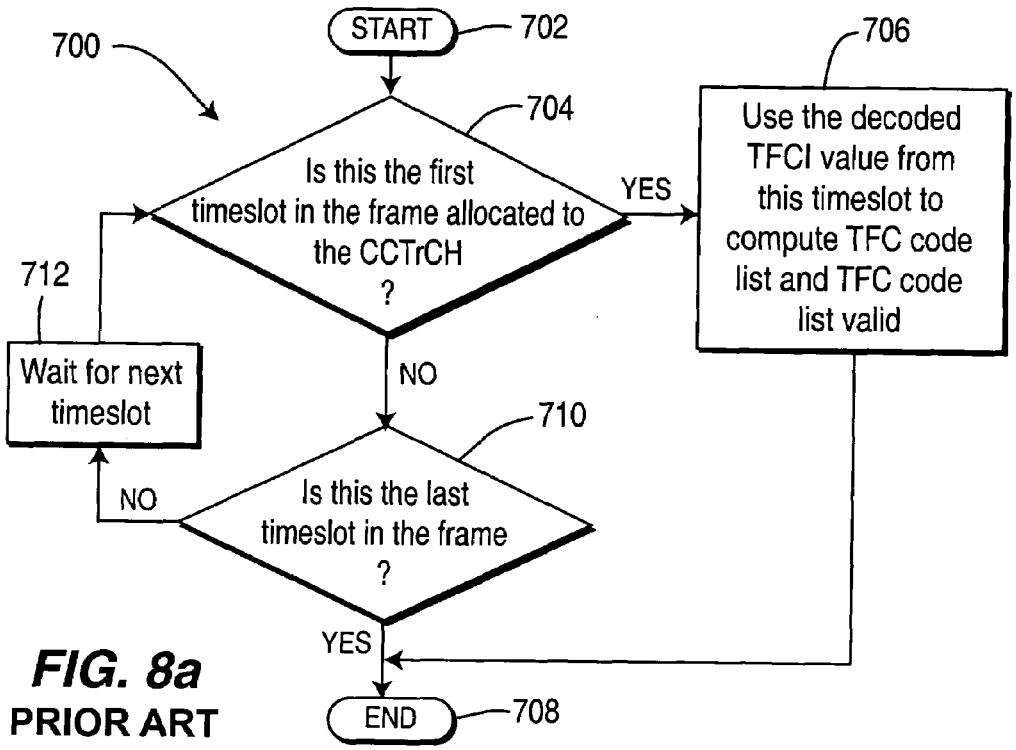
FIG. 8a is a flowchart showing the use of the TFCI value from the first allocated timeslot in a frame.

Referring now to FIG. 8a, a flowchart of a method 700 for using the TFCI word from the first allocated timeslot in each frame is shown. The method 700 begins (step 702) with a determination whether the current timeslot is the first timeslot in the frame allocated to the coded composite transport channel (CCTrCH; step 704). If this timeslot is the first in the frame allocated to the CCTrCH, then the decoded TFCI value from this timeslot is used to compute the TFC code list and the TFC code list valid flag (step 706), and the method then terminates (step 708). If the current timeslot is not the first in the frame allocated to the CCTrCH, then a determination is made whether the current timeslot is the last timeslot in the frame (step 710). If it is the last timeslot, then the method terminates (step 708) and the TFC code list and the TFC code list valid flag are not generated for the current frame. If the current timeslot is not the last timeslot in the frame, then the method waits for the next timeslot (step 712) and repeats step 704 for the next timeslot. The receiver uses the TFCI decoder output from the first timeslot allocated to the CCTrCH in each frame to compute the TFC code list and the TFC code list valid flag. Thus, the TFC code list and the TFC code list valid flag are computed only once per frame.

Figure 8B:
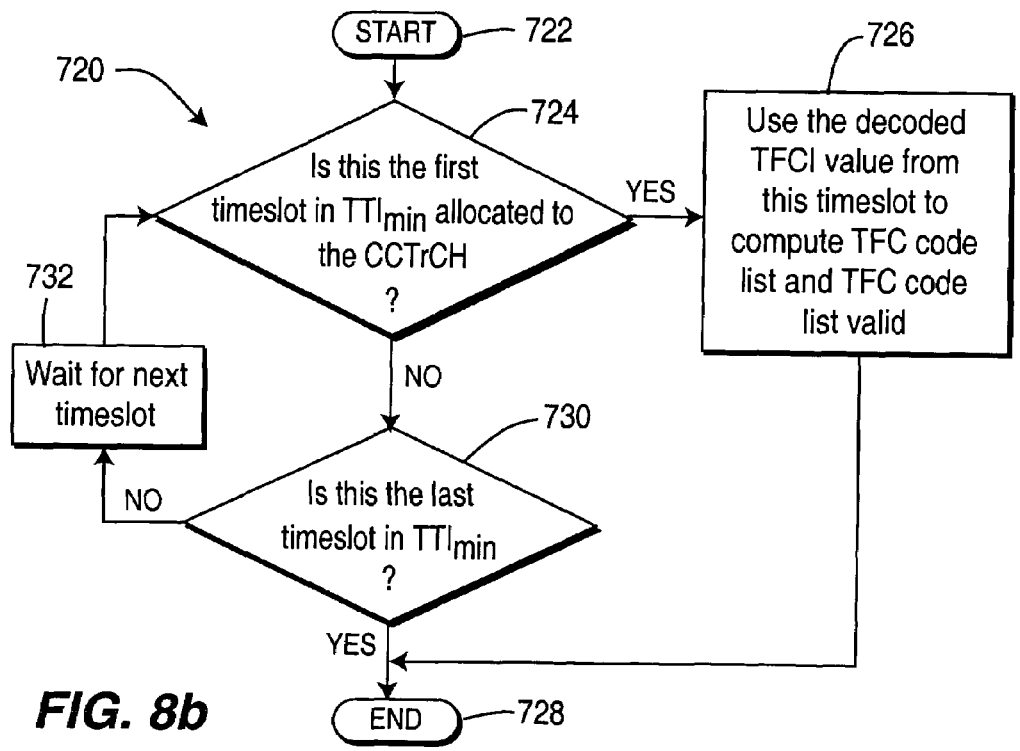
FIG. 8b is a flowchart showing the use of the TFCI value from the first allocated timeslot in a minimum TTI.

FIG. 8b shows a flowchart of a method 720 for using the TFCI word from the first allocated timeslot in a minimum transmit time interval ($TTI_{min}$). The method 720 begins (step 722) with a determination whether the current timeslot is the first timeslot in the $TTI_{min}$ allocated to the CCTrCH (step 724). If this timeslot is the first in the $TTI_{min}$ allocated to the CCTrCH, then the decoded TFCI value from this timeslot is used to compute the TFC code list and the TFC code list valid flag (step 726), and the method then terminates (step 728). If the current timeslot is not the first in the $TTI_{min}$ allocated to the CCTrCH, then a determination is made whether the current timeslot is the last timeslot in the $TTI_{min}$ (step 730). If it is the last timeslot, then the method terminates (step 728) and the TFC code list and the TFC code list valid flag are not generated for the current frame. If the current timeslot is not the last timeslot in the $TTI_{min}$, then the method waits for the next timeslot (step 732) and repeats step 724 for the next timeslot. The receiver uses the TFCI decoder output from the first timeslot allocated to the CCTrCH in $TTI_{min}$ to compute the TFC code list and the TFC code list valid flag. Thus, the TFC code list and the TFC code list valid flag are computed only once per $TTI_{min}$.

The $TTI_{min}$ becomes relevant when a CCTrCH contains multiple TrCHs multiplexed into it. Each TrCH can have a different TTI length, for example, 20, 40, or 80 milliseconds. $TTI_{min}$ is the shortest TTI among all of the TrCHs that are multiplexed into the CCTrCH. The transmitted TFCI value will be constant for at least $TTI_{min}$.

Figure 8C:
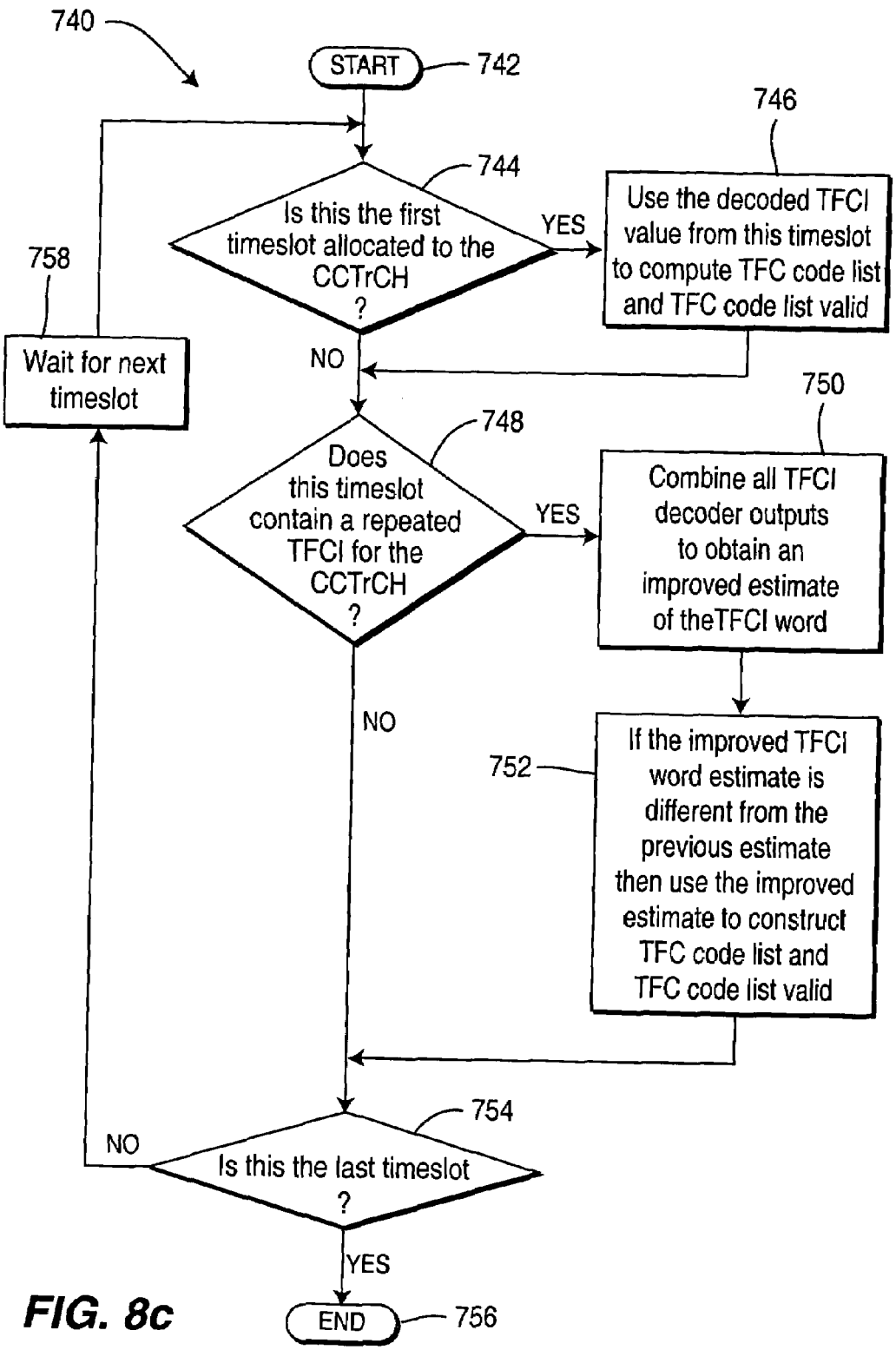
FIG. 8c is a flowchart showing the use of TFCI values from multiple timeslots.

FIG. 8c shows a flowchart of a method 740 for using TFCI words from multiple timeslots. The method 740 begins (step 742) with a determination whether the current timeslot is the first timeslot allocated to the CCTrCH (step 744). If this timeslot is the first timeslot allocated to the CCTrCH, then the decoded TFCI value from this timeslot is used to compute the TFC code list and the TFC code list valid flag (step 746). Next, a determination is made whether the current timeslot contains a repeated TFCI for the CCTrCH (step 748). If yes, then all of the TFCI decoder outputs are combined to obtain an improved estimate of the TFCI word (step 750). If the improved estimate of the TFCI word is different than the previous estimate of the TFCI word, then the improved TFCI estimate is used to construct the TFC code list and the TFC code list valid flag (step 752).

If the current timeslot does not contain a repeated TFCI for the CCTrCH (step 748) or if step 752 has been executed, the next step is a determination of whether the current timeslot is the last timeslot (step 754). If it is the last timeslot, then the method terminates (step 756). If it is not the last timeslot, then the method waits for the next timeslot (step 758) and repeats step 744 for the next timeslot.

The method 740 is applicable to any time period, whether it is a single frame or a $TTI_{min}$ spanning multiple frames. If the CCTrCH has a TTI that is longer than $TTI_{min}$, then the longest TTI is required to be a multiple of $TTI_{min}$. In that case, the method 740 would repeated at least every interval of $TTI_{min}$. If the TFCI word decoded at the receiver is incorrect, then the TFC code list may be incorrect, which would lead to decoded data errors. The TFCI signaled to the receiver (and the transmitted code list) is constant for the number of frames corresponding to $TTI_{min}$. For each CCTrCH, there is at least one TFCI transmitted per frame and possibly more. Thus, each TFCI value will be transmitted at least once and possibly multiple times per frame, and possibly in multiple frames. The TFCI processing may only use the first received TFCI; however, this does not use all possible TFCI words that have been transmitted and may lead to an unacceptably high TFCI error rate.

In the method 740, the receiver initially uses the TFCI decoder output from the first timeslot allocated to the CCTrCH in each time period (either a frame or $TTI_{min}$). If subsequent TFCI words are transmitted in a time period, then the outputs of the TFCI decoder are combined to form an improved estimate of the TFCI word. The TFCI decoder outputs may be combined by determining which TFCI word was selected most often, by soft combining the outputs corresponding to every possible TFCI word, or any other method used to combine the multiple outputs of a decoder to improve the error performance. If the improved estimate is different than the previous estimate, then the improved estimate is used to construct a new version of the TFC code list and the TFC code list valid flag. In this approach, the TFC code list and the TFC code list valid flag may be computed once or more than once per time period. Each new computation is based on a better estimate of the TFCI word, which reduces the number of TFCI errors and the number of decoded data errors.

When used in conjunction with $TTI_{min}$, if $TTI_{min}$>10 ms, then performance is further improved compared to the previous approach because there are more TFCI decoder outputs that can be combined to form a better estimate of the TFCI word. Another alternate approach is to use any combination of some or all TFCI decoder outputs within a frame or $TTI_{min}$ to form a better estimate of the TFCI word.

A TFCI value is valid if it equals zero, indicating a special burst, or if it corresponds to a valid entry in the TFCS. If a TFCI decoding error occurs, or if the decoded TFCI does not correspond to a valid entry in the TFCS for any other reason, then the TFC code list cannot be filled in and the TFC code list valid flag is set false. BCD nevertheless provides a list of channelization codes, midamble offsets, and spreading factors to the MUD as described in U.S. patent application Ser. No. 10/396,992. The processing of the received TFCI at the frame rate algorithm requires a TFCI value to provide TFC parameters to the decoding and demultiplexing algorithms.

The present invention permits a TFCI value to be selected when the decoded TFCI is not valid. The receiver uses the decoded TFCI from the previous frame or $TTI_{min}$ during which the CCTrCH had one or more allocated timeslots. An alternate approach is for the receiver to use the first entry in the TFCS. Another alternate approach is for the receiver to maintain a list of recently decoded valid TFCI words and select the value that has been decoded the most times.

The present invention provides several improvements over receivers known in the art. First, in regard to the fast TFCI processing, the typical method of analyzing the TFCI was at the end of the frame. The present invention performs some TFCI processing on a timeslot basis, which permits the information contained in the TFCI to be used in timeslots during the frame in which it was received, as opposed to being limited to being used after all the timeslots in a frame have been processed or in subsequent frames. Another improvement relates to the use of the full DTX control algorithm and its interaction with the inner loop power control, outer loop power control, and processing subsequent to decoding and demultiplexing. By processing the TFCI on a timeslot basis and prior to the decoding and demultiplexing of received signals, the determination of whether the CCTrCH is in full DTX can be made sooner and the conclusion regarding the full DTX state can be used more effectively by other processing blocks. Another improvement is the use and processing of repeated TFCI transmissions to improve the likelihood of providing the correct value to subsequent processing. When a TFCI value is transmitted more than once, each repeated transmission can be used to incrementally improve the decoded TFCI value and to update the output of processing blocks that use the TFCI value. Another improvement relates to methods of determining a TFCI value when a valid TFCI word was not provided by the TFCI decoder. By using a TFCI value based on previously decoded values or valid entries in the TFCS, a valid TFCI value can be selected to process signals received in a timeslot.

While this invention has been particularly shown and described with reference to preferred embodiments, it will be understood by those skilled in the art that various changes in form and details may be made without departing from the scope of the invention as described hereinabove.

What is claimed is:

1. A method for obtaining a transport format combination indicator (TFCI) value, comprising:
   collecting received samples;
   processing the received samples to obtain soft TFCI symbols;
   decoding the soft TFCI symbols to obtain a TFCI value;
   evaluating the TFCI value to determine if it is a valid index of a transport format combination set (TFCS);
   if the TFCI value is a valid index of the TFCS, then
      using the TFCI value obtained in the decoding step and ending the method;

if the TFCI value is not a valid index of the TFCS, then
selecting a valid TFCI value and using the selected TFCI value.

2. The method according to claim 1, wherein the selecting includes selecting a decoded TFCI value from a previous frame.

3. The method according to claim 1, wherein the selecting includes selecting a decoded TFCI value from a previous minimum transmission time interval.

4. The method according to claim 1, wherein the selecting includes selecting a TFCI value corresponding to the first entry in the TFCS.

5. The method according to claim 1, wherein the selecting includes selecting a TFCI value from a list of recently decoded TFCI values, wherein the selected TFCI value has been output the most frequently.

* * * * *

UNITED STATES PATENT AND TRADEMARK OFFICE
CERTIFICATE OF CORRECTION

PATENT NO. : 7,529,220 B2 Page 1 of 1
APPLICATION NO. : 10/629434
DATED : May 5, 2009
INVENTOR(S) : DiFazio et al.

It is certified that error appears in the above-identified patent and that said Letters Patent is hereby corrected as shown below:

IN THE SPECIFICATION

At column 3, line 14, after the words "be in" delete ""full DIX"" and insert therefor --"full DTX"--.

At column 6, line 52, after the words "examines the" delete "QTFCI" and insert therefor --$Q_{TFCI}$--.

At column 11, line 15, before the words "not need" delete "does" and insert therefor --do--.

At column 12, line 2, before the words "the first" delete "follow" and insert therefor --follows--.

At column 13, line 29, before the word "repeated" insert --be--.

Signed and Sealed this

Twenty-first Day of July, 2009

JOHN DOLL
*Acting Director of the United States Patent and Trademark Office*